United States Patent [19]

Mila

[11] 3,863,216

[45] Jan. 28, 1975

[54] ARRANGEMENT AND METHOD FOR ASSURING THE VALIDITY OF TRANSFERRED DATA

[75] Inventor: Truman R. Mila, Batavia, Ill.

[73] Assignee: GTE Automatic Electric Laboratories Incorporated, Northlake, Ill.

[22] Filed: Sept. 14, 1973

[21] Appl. No.: 397,504

[52] U.S. Cl. .......................... 340/146.1 R, 179/18 ES

[51] Int. Cl. .......................... G08b 29/00, H04m 3/08

[58] Field of Search .... 179/18 ES, 179 ET, 179 EB; 340/146.1 AB, 146.1 R

[56] References Cited

UNITED STATES PATENTS

| | | | |
|---|---|---|---|
| 3,385,931 | 5/1968 | Lucas | 179/18 ES |
| 3,467,776 | 9/1969 | VanDuuren | 340/146.1 AB |
| 3,529,290 | 9/1970 | Schroeder | 340/146.1 AB |

*Primary Examiner*—Gareth D. Shaw
*Assistant Examiner*—James D. Thomas

[57] ABSTRACT

An arrangement and method for assuring the validity of data transferred between subsystems in, for example, common control communication switching systems. Data such as digits and commands are transferred in a 2/6 code, and an additional 1/2 code is used to create a data window during the occurrence of which the data is guaranteed to be valid.

8 Claims, 3 Drawing Figures

3 Sheets-Sheet 1

ARRANGEMENT AND METHOD FOR ASSURING THE VALIDITY OF TRANSFERRED DATA

This invention relates to a centralized automatic message accounting system and, more particularly, to an arrangement and method for assuring the validity of data transferred between the subsystems thereof.

In the hereinafter described centralized automatic message accounting system, the function of the receivers therein are to receive the MF and dial pulse information from the originating subscriber and to forward this information in a checkable code to the system's call processor. The problem with transmitting this information or data is that the incoming digits and/or commands are not synchronized with the call processor. In other words, the digits and/or commands can appear at any time with respect to the time cycle of the call processor. Since this information or data can appear at any time, there is a possibility that only one of two data bits, the information being forwarded in a 2/5 code, will become valid at the instant that the call processor scans the receiver.

Accordingly, it is an object of the present invention to provide an arrangement and method for assuring the validity of the data transferred between the receiver and the call processor within a system such as the centralized automatic message accounting system.

Figure 1:
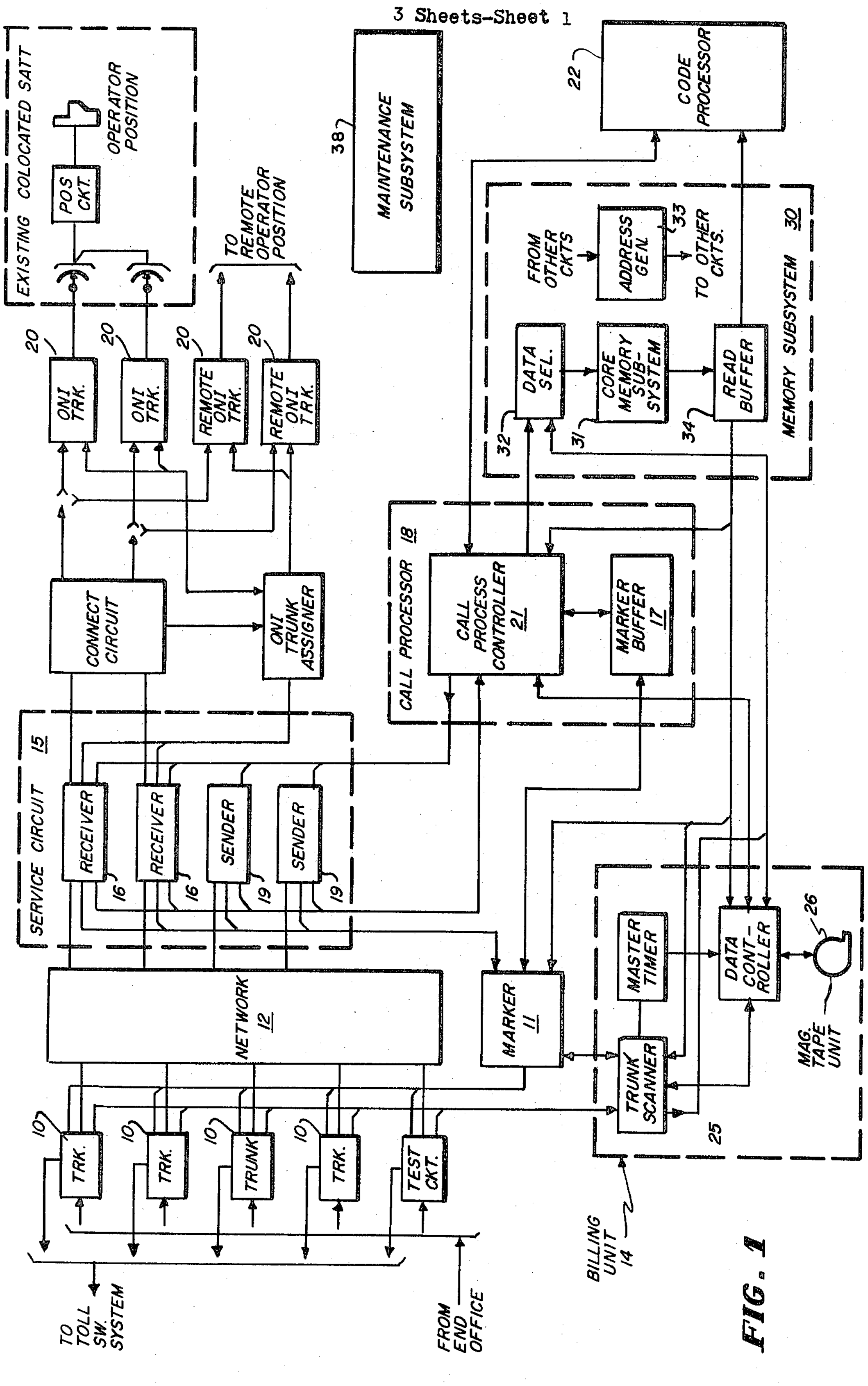
Figure 2A:
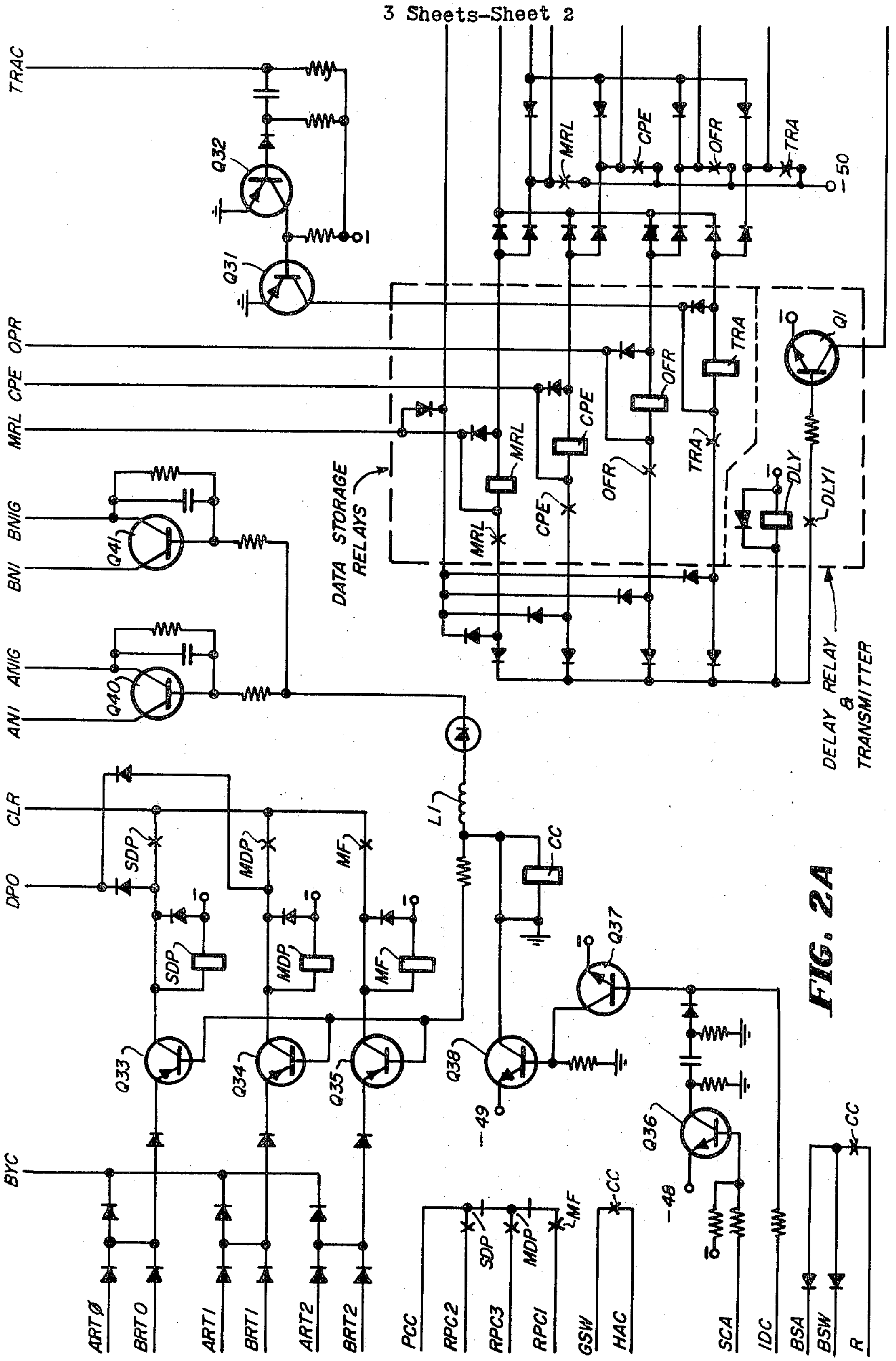
Figure 2B:
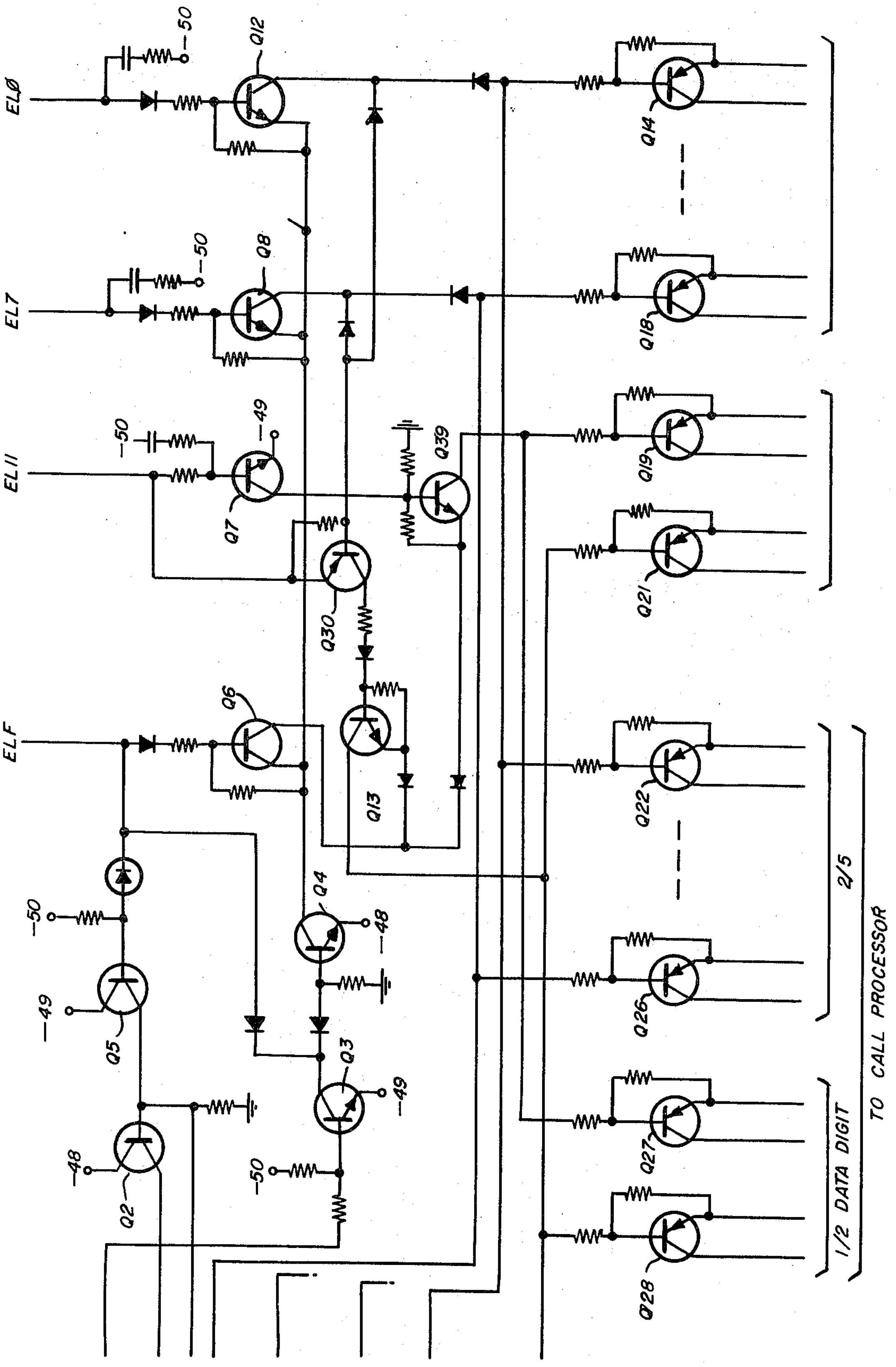

For a fuller understanding of the nature and objects of the invention, reference should be had to the following detailed description taken in connection with the accompanying drawings, in which:

FIG. 1 is a block diagram schematic of the centralized automatic message accounting system; and FIG. 2A and 2B is a schematic of the portion of a receiver which forwards the information to the call processor.

Similar reference characters refer to similar parts throughout the several views of the drawings.

DESCRIPTION OF THE INVENTION

Referring now to the drawings, in FIG. 1 the centralized automatic message accounting system is illustrated in block diagram, and the functions of the principal equipment elements can be generally described as follows. The trunks 10, which may be either multifrequency (MF) trunks or dial pulse (DP) trunks, provide an interface between the originating office, the toll switching system, the marker 11, the switching network 12, and the billing unit 14. The switching network 12 consists of three stages of matrix switching equipment between its inlets and outlets. A suitable distribution of links between matrices are provided to insure that every inlet has full access to every outlet for any given size of the switching network. The three stages, which consist of A, B and C crosspoint matrices, are interconnected by AB and BC links. The network provides a minimum of 80 inlets, up to a maximum of 2,000 inlets and 80 outlets. Each inlet extends into an A matrix and is defined by an inlet address. Each outlet extends from a C matrix to a terminal and is defined by an outlet address.

Each full size network is divided into a maximum of 25 trunk grids on the inlet side of the network and a service grid with a maximum of 16 arrays on the outlet side of the network. The trunk grids and service grid within the networks are interconnected by the BC link sets of 16 links per set. Each MF trunk grid is provided for 80 inlets. Each DP trunk grid is provided for 40 inlets. The service grid is provided for a maximum of 80 outlets. A BC link is defined as the interconnection of an outlet of a B matrix in a trunk grid and an inlet of a C matrix in the service grid.

The marker 11 is the electronic control for establishing paths through the electromechanical network. The marker constantly scans the trunks for a call for service. When the marker 11 identifies a trunk with a call for service, it determines the trunk type, and establishes a physical connection between the trunk and a proper receiver 16 in the service circuits 15.

The trunk identity and type, along with the receiver identity, are temporarily stored in a marker buffer 17 in the call processor 18 which interfaces the marker 11 and the call processor 18.

When the call processor 18 has stored all of the information transmitted from a receiver, it signals the marker 11 that a particular trunk requires a sender 19. The marker identifies an available sender, establishes a physical connection from the trunk to the sender, and informs the call processor 18 of the trunk and sender identities.

The functions of the receivers 16 are to receive MF 2/6 tones or DP signals representing the called number, and to convert them to an electronic 2/5 output and present them to the call processor 18. A calling number is received by MF 2/6 tones only. The receivers will also accept commands from the call processor 18, and interface with the ONI trunks 20.

The function of the MF senders are to accept commands from the call processor 18, convert them to MF 2/6 tones and send them to the toll switch.

The call processor 18 provides call processing control and, in addition, provides temporary storage of the called and calling telephone numbers, the identity of the trunk which is being used to handle the call, and other necessary information. This information forms part of the initial entry for billing purposes in a multi-entry system. Once this information is passed to the billing unit 14, where a complete initial entry is formated, the call will be forwarded to the toll switch for routing.

The call processor 18 consists of the marker buffer 17 and a call processor controller 21. There are 77 call stores in the call processor 18, each call store handling one call at a time. The call processor 18 operates on the 77 call stores on a time-shared basis. Each call store has a unique time slot, and the access time for all 77 call stores is equal to 39.4 MS, plus or minus 1 percent.

The marker buffer 17 is the electronic interface between the marker 11 and the call processor controller 21. Its primary functions are to receive from the marker 11 the identities of the trunk, receiver or sender, and the trunk type. This information is forwarded to the appropriate call store.

The operation of the call process controller revolves around the call store. The call store is a section of memory allocated for the processing of a call, and the call process controller 21 operates on the 77 call stores sequentially. Each call store has eight rows and each row consists of 50 bits of information. The first and second rows are repeated in rows 7 and 8, respectively. Each row consists of two physical memory words of 26 bits per word. Twenty-five bits of each word are used for storage of data, and the twenty-sixth bit is a parity bit.

The call processor controller 21 makes use of the information stored in the call store to control the progress of the call. It performs digit accumulation and the sequencing of digits to be sent. It performs fourth digit 0/1 blocking on a six or 10 digit call. It interfaces with the receivers 16, the senders 19, the code processor 22, the billing unit 14, and the marker buffer 17 to control the call.

The main purpose of the code processor 22 is to analyze call destination codes in order to perform screening, prefixing and code conversion operations of a nature which are originating point dependent. This code processing is peculiar to the needs of direct distance dialing (DDD) originating traffic and is not concerned with trunk selection and alternate routing, which are regular translation functions of the associated toll switching machine. The code processor 22 is accessed only by the call processor 18 on a demand basis.

The billing unit 14 receives and organizes the call billing data, and transcribes it onto magnetic tape. A multi-entry tape format is used, and data is entered into tape via a tape transport operating in a continuous recording mode. After the calling and called director numbers, trunk identity, and class of service information is checked and placed in storage, the billing unit 14 is accessed by the call process controller 21. At this time, the call record information is transmitted into the billing unit 14 where it is formated and subsequently recorded on magnetic tape. The initial entry will include the time. Additional entries to the billing unit 14 contain answer and disconnect information.

The trunk scanner 25 is the means of conveying the various states of the trunks to the billing unit 14. The trunk scanner 25 is connected to the trunks by a highway extending from the billing unit 14 to each trunk. Potentials on the highway leads will indicate states in the trunks.

Each distinct entry (initial, answer, disconnect) will contain a unique entry identity code as an aid to the electronic data processing (EDP) equipment in consolidating the multi-entry call records into toll billing statements. The billing unit 14 will provide the correct entry identifier code. The magnetic tape unit 26 is comprised of the magnetic tape transport and the drive, storage and control electronics required to read and write data from and to the nine channel billing tape. The read function will allow the tape unit to be used to update the memory.

The recorder operates in the continuous mode at a speed of 5 inches per second, and a packing density of 800 bits per inch. Billing data is recorded in a multi-entry format using a nine bit EBCDIC character (extended binary coded decimal interchange code). The memory subsystem 30 serves as the temporary storage of the call record, as the permanent storage of the code tables for the code processor 22, and as the alterable storage of the trunk status used by the trunk scanner 25.

The core memory 31 is composed of ferrite cores as the storage elements, and electronic circuits are used to energize and determine the status of the cores. The core memory 31 is of the random access, destructive readout type, 26 bits per word with 16 K words.

For storage, data is presented to the core memory data registers by the data selector 32. The address generator 33 provides the address or core storage locations which activate the proper read/write circuits representing one word. The proper clear/write command allows the data selected by the data selector 32 to be transferred to the core storage registers for storage into the addressed core location.

For readout, the address generator 33 provides the address or core storage location of the word which is to be read out of memory. The proper read/restore command allows the data contained in the word being read out, to be presented to the read buffer 34. With a read/restore command, the data being read out is also returned to core memory for storage at its previous location.

The method of operation of a typical call in the system, assuming the incoming call is via an MF trunk can be described as follows. When a trunk circuit 10 recognizes the seizure from the originating office, it will provide an off-hook to the originating office and initiate a call-for-service to the marker 11. The marker 11 will check the equipment group and position scanners to identify the trunk that is requesting service. Identification will result in an assignment of a unique four digit 2/5 coded equipment identity number. Through a trunk-type determination, the marker 11 determines the type of receiver 16 required and a receiver/sender scanner hunts for an idle receiver 16. Having uniquely identified the trunk and receiver, the marker 11 makes the connection through the three-stage matrix switching network 12 and requests the marker buffer 17 for service.

The call-for-service by the marker 11 is recognized by the marker buffer 17 and the equipment and receiver identities are loaded into a receiver register of the marker buffer 17. The marker buffer 17 now scans the memory for an idle call store to be allocated for processing the call, under control of the call process controller 21. Detection of an idle call store will cause the equipment and receiver identities to be dumped into the call store. At this time, the call process controller 21 will instruct the receiver 16 to remove delay dial and the system is now ready to receive digits.

Upon receipt of a digit, the receiver 16 decodes that digit into 2/5 code and times the duration of digit presentation by the calling end. Once it is ascertained that the digit is valid, it is presented to the call processor 18 for a duration of no less than 50 milliseconds of digit and 50 milliseconds of interdigital pause for storage in the called store. After receipt of "ST," the call processor controller 21 will command the receiver 16 to instruct the trunk circuit 10 to return an off-hook to the calling office, and it will request the code processor 22.

The code processor 22 utilizes the called number to check for EAS blocking and other functions. Upon completion of the analysis, the code processor 22 will send to the call processor controller 21 information to route the call to an announcement or tone trunk, at up to four prefix digits if required, or provide delete information pertinent to the called number. If the call processor controller 21 determined that the call is an ANI call, it will receive, accumulate and store the calling number in the same manner as was done with the called number. After the call process controller 21 receives "ST," it will request the billing unit 14 for storage of an initial entry in the billing unit memory. It will also command the receiver 16 to drop the trunk to receiver connection. The call processor controller 21 now initiates a request to the marker 11 via the marker buffer 17 for a trunk to sender connection. Once the marker 11 has made the connection and has transferred the identities to the marker buffer 17, the marker buffer will dump this information into the appropriate call store. The call processor controller 21 now interrogates the sender 19 for information that delay dial has been removed by the routing switch (crosspoint tandem or similar). Upon receipt of this information the call processor controller 21 will initiate the sending of digits including "KP" and "ST." The call process controller 21 will control the duration of tones and interdigital pause. After sending of "ST," the call processor 18 will await the receipt of the matrix release signal from the sender 19. Receipt of this signal will indicate that the call has been dropped. At this time, the sender and call store are returned to idle, ready to process a new call.

The initial entry information when dumped from the call store is organized into the proper format and stored in the billing unit memory. Eventually, the call answer and disconnect entries will also be stored in the billing unit memory. The initial entry will consist of approximately 40 characters and trunk scanner 25 entries for answer or disconnect contain approximately 20 characters. These entries will be temporarily stored in the billing unit memory until a sufficient number have been accumulated to comprise one data block of 1,370 characters. Once the billing unit memory is filled, the magnetic tape unit 26 is called and the contents of the billing unit memory is recorded onto the magnetic tape.

The final result of actions taken by the system on a valid call will be a permanent record of billing information stored on magnetic tape in multi-entry format consisting of initial, answer, and disconnect or forced disconnect entries.

Answer timing, force disconnect timing and other timing functions such as, for example, a "grace period" timing interval on answer, in the present system, are provided by the trunk timers. These trunk timers are memory timers, and an individual timer is provided for each trunk in a trunk scanner memory which comprises a status section and a test section.

The status section contains one word per ticketed trunk. Each word contains status, instruction, timing and sequence information. The status section also provides one word per trunk group which contains the equipment group number, and an equipment position tens word that identifies the frame. A fully equipped status section requires 2,761 words of memory representing 2,000 trunks spread over 60 groups plus a status section "start" word. As each status word is read from memory, it is stored in a trunk scanner read buffer (not shown). The instruction is read by a scanner control to identify the contents of the word. The scanner control logic acts upon the timing, sequence and status information, and returns the updated word to the trunk scanner memory and it is written into it for use during the next scanner cycle.

The test section contains a maximum of 83 words: a start word, a last programmed word, 18 delay words, two driver test words, one end-test word and one word for each equipment group. The "start test" word causes a scan point test to begin. The delay words allow time for scan point filters to charge before the trunk groups are scanned, with the delay words containing only instructional data. The equipment group words contain a two digit equipment group identity and five trunk frame equipped bits. The trunk frame equipped bits (one per frame) indicates whether or not a frame exists in the position identified by its assigned bit. The delay words following the equipment group allow the scan point filters to recharge before the status section of memory is accessed again for normal scanning. The Last Program word inhibits read and write in the trunk scanner memory until a trunk scanner address generator has advanced through enough addresses to equal the scanner cycle time. When the cycle time expires, the trunk scanner address generator returns to the start of the status section of memory and normal scanning recommences.

The trunk scanner memory and the trunk scanner read buffer are not part of the trunk scanner 25, however, the operation thereof is controlled by a scanner control which forms a part of the trunk scanner 25 of the billing unit 14. The trunk scanner 25 maintains an updated record of the status of each ticketed trunk, determines from this status when a billing entry is required, and specifies the type of entry to be recorded. The entry includes the time it was initiated and the identification of its associated trunk.

Scanning is performed sequentially, by organizing the memory in such a manner that when each word is addressed, the trunk assigned to that address is scanned. This causes scanning to progress in step with the trunk scanner address generator. During the address advance interval, the next scanner word is addressed and, during the read interval, the word is read from memory and stored in the trunk scanner read buffer. At this point, the trunk scanner 25 determines the operations to be performed by analyzing the word instruction.

As indicated above, scanning is performed sequentially. If all trunks in all groups are scanned in numerical sequence beginning with trunk 0000, scanning would proceed in the following manner:

Step 1. Trunk 0000 located in frame 00 (lineup 0, column 0) in the top file, leftmost card position would be scanned first.

Step 2. All trunks located in frame 00 and the leftmost card position would be scanned next from the top file to the bottom.

Step 3. Scanning advances to frame 01 (lineup 0, column 1) and proceeds as in Step 2.

Step 4. Scanning proceeds as in Step 3 until frame 04 has been scanned.

Step 5. The scanner returns to frame 00 and Step 2 is repeated for the next to leftmost card position.

Step 6. The sequence just described continues until all ten card positions in all five columns have been examined.

Step 7. The entire process is repeated in lineups 1 through 5.

When a memory word instruction identifies a trunk group word, the status receivers are cleared to prepare for scanning the trunks specified in the group word. The trunk group digits stored in the trunk scanner read buffer (TSRB) are transferred into the equipment group register.

After the trunk group number is decoded, it is transformed into binary code decimals (BCD), processed through a 1-out-of-N check circuit, and applied to the AC bus drivers (ACBD). The drivers activate the scan point circuits via the group leads and the trunk status is returned to the receivers.

A group address applied to the drivers causes the status of all trunks in 1 lineup and 1 card position and all columns to be returned to the receivers. The group tens digit specifies the trunk frame lineup and the group units digit identifies the card slot.

When a status word is read from memory, it sets the previous count of a trunk timer (TT) into the trunk timer.

If the trunk is equipped and the forced disconnect sequence equals 2 (FDS=2), a request to force release the trunk is transmitted to the marker 11. If FDS does not equal 2, the present condition of the ticketing contacts in the trunk is tested. If the instruction indicates that the trunk is in an updated condition (the trunks associated memory word was reprogrammed) it is tested for idle. If the trunk is idle, its instruction is changed to denote that it is ready for new calls. If the trunk is not idle, no action is taken and the trunk scanner 25 proceeds to the next trunk.

If the trunk is not in the updated condition and FDS=3, the trunk is tested for idle. If the trunk is idle, FDS is set to 0 and TT is reset.

If FDS does not equal 3 and a match exists between the present contact status and the previous contact status stored in memory (bits 5 and 6) the FDS memory bits are inspected for a count equal to 1. If FDS=1, TT is reset and the memory contact status is updated. If FDS does not equal 1, TT is not reset.

During any analysis of a trunk status, a change in the contact configuration of a trunk is not considered valid until it has been examined twice.

One bit (SFT) is provided in each memory status word to inicate whether or not a change in status of the trunk was detected during the previous scan cycle.

When a change in status is detected, SFT is set to 1. If SFT=1 on the next cycle, the status is analyzed and SFT is set to 0.

If a mismatch exists between the present contact condition and that previously stored in memory, the status has changed and a detailed examination of the status is started.

If CT=1, the trunk is busy and so the previous condition of the contact is inspected. If the trunk previously was idle, CM=0. Before continuing the analysis, it must be determined if this is the first indication of change in the trunk status by examining the "second look" bit (SFT). If SFT=0, it is set to equal 1, and the analysis of this trunk status is discontinued until the next scanner cycle. If SFT=1, the memory status is updated and SFT is set to equal 0.

If CT=1, the trunk is cut through and CM is inspected to determine if the memory status was updated. If CM=1, the GT contact status must differ from GM since it was already determined that a mismatch exists. If GT=0, answer has not occurred. If GT=1, and this condition existed during the previous scan cycle, SFT=1 also. If these conditions are true and FDS does not equal 1, TT is advanced and answer timing begins. If these conditions persist for eight scanner cycles (approximately 1 second), answer is confirmed and an entry will be stored in the trunk scanner formater (TSF). If answer is aborted (possibly hookswitch fumble) before the 1 second answer time (time is adjustable) expires, TT remains at its last count. When the answer condition returns, answer timing continues from the last TT count. Thus, answer timing is cumulative.

After an answer entry is stored, which includes the TT count, TT is reset, SFT is set to 0, and the new contact status is written into memory.

If a mismatch exists and CT=0, the previous state of this contact is inspected by examining bit 5 in the trunk scanner read buffer (TSRB). If CM=1, the state of the terminating end of the trunk is tested. If GT=1, then the condition of the trunk has just changed from answer to disconnect. If this condition existed during the previous scan cycle, SFT=1 and a disconnect entry is stored in the TSF.

After the disconnect entry is stored, which includes the TT count, TT is reset, FDS and SFT are set to 0, and the new status is written into memory.

If a mismatch exists and the originating end of a trunk is not released, both CT and CM equals 1. If GT=0 after the previous scan cycle, FDS is tested. If this change just occurred, FDS does not equal 1. Since FDS does not equal 1, it will be set equal to 1 and TT will reset. FDS=1 indicates that forced disconnect timing is in progress.

While the conditions just described exist, i.e., mismatch, CT=1, CM=1, GT=0 and FDS=1, TT will advance 1 count during each scanner cycle, if one half second has elapsed since the last scan cycle. TT will continue to advance until it reaches a count of 20 (approximately 10 seconds) when a forced disconnect entry will be stored in the TSF.

When the entry is stored, FDS is set at 2 indicating that the trunk is to be force released. After the entry is stored, which includes the TT count, TT is reset, SFT is set to 0, and the new status is written into memory.

After the status and test sections of the memory have been accessed, the Last Program word is read from memory and stored in the trunk scanner read buffer. This word causes read/write in the trunk scanner portion of memory to be inhibited and deactivates the scan point test. The trunk scanner address generator will continue to advance, however, until sufficient words have been addressed to account for one scan cycle. When a predetermined address, the Last Address, is reached, block read/write is removed and the address generator returns to the Start Address (First Program Word) of the scanner memory.

As indicated above, the function of the receivers 16 in the service circuit 15 is to receive the MF or DP information from the originating subscriber and to forward this information, either a digit or a command, in a checkable 2/5 code to the call processor 18. In transmitting this information, a problem arises due to the fact that the incoming data is not synchronized with the cell processor 18. That is, the data can appear at any time with respect to the time cycle of the call processor 18. Therefore, since this data can appear at any time, there is a possibility that only one of the two data bits will become valid at the instant that the call processor 18 scans the receiver 16.

In accordance with the present invention, this problem is eliminated by providing a data window during which data validity is guaranteed. More particularly, in order to prevent false recognition of data, an additional 1/2 code signal is provided, to allow the call processor 18 a data window during which it would be guaranteed that the data present on the 2/5 data leads would be valid.

More particularly, in FIG. 2, the 2/5 data, either a digit or a command, is presented to the call processor 18 via the two sets of transistors (transistors Q14--18 or transistors Q22–Q26) and a scan point circuit (not shown) which includes filters that result in a delay in the order of 300 to 500 microseconds before the data bits are valid. The above-mentioned two sets of transistors are used for one of the duplicated, redundant call processors in the system, respectively.

The receiving of 2/6 MF tones and converting them to logic levels, and the receiving of dial pulse digits and converting them from BCD to 2/5 code is performed by another portion of the receiver 16, to provide 2/6 outputs plus a flag signal. These 2/6 outputs are coupled to the disclosed portion of the receiver as inputs ELϕ, EL1, EL2, EL4, EL7 and EL11, and the flag signal as input ELF.

The command signals also are coupled to the disclosed portion of the receiver, as inputs MRL, CPE, OFR and TRAC, and are ground inputs to operate relays MRL, CPE, OFR and TRAC, respectively. The command MRL is a matrix released or abandon call command, and occurs when the matrix is dropped by the trunk due to an abandoned call or by commands from the call processor. The command CPE is a call processor parity error command, and is activated when information from the cell processor fails a 2/5 check, to inform the call processor of such condition. The OFR command is an operator forced release command, and is activated when the ONI operator drops the call before all proper functions have been finished. The command TRAC is an ONI trunk attached command, and is activated when the ONI matrix has been established between the receiver and the ONI trunk.

As indicated above, this data, both the digitial and command information, can appear at any time, out of synchronism with the call processor, so that only one of the two data bits may be valid at the instant that the call processor 18 scans the receiver. A data window during which validity is guaranteed is provided to eliminate this problem, by providing an additional 1/2 code signal to the call processor. If this 1/2 code signal is absent, the call processor will ignore the data present, until the 1/2 code signal becomes true.

The 1/2 code signal is provided by the transistors Q19 and Q21, or the transistors Q27 and Q29, as follows. The digital information is coupled to the inputs ELϕ . . . EL11 by means of electronic latches (not shown), as is the flag signal coupled to the input ELF. The operation of the electronic latches is such that the flag signal input ELF is delayed for 4 milliseconds after the 2/6 outputs to the inputs ELϕ . . . EL11 have been stable.

During idle conditions, all of these inputs ELϕ . . . EL11 and ELF are at −50 volts. The input signals to them are at ground level, and turn ON the respective ones of the transistors Q6 to Q12. The collector outputs of these transistors Q6 to Q12 are either directly or indirectly used to turn ON the two sets of transistors Q14–Q19 and Q21, and Q22–Q27 and Q29. Each set is encoded in 2/5 and 1/2 code, where the signal A(B)RD (transistors Q21 and Q27, respectively, turned ON to provide ARD and BRD outputs) indicate that the 2/5 code signals A(B)Rϕ . . . A(B)R7 constitute a digit. As indicated above, unless the data indicator signal A(B)RD is true (or command indicator signal A(B)RC, described below), the call processor 18 will ignore the data present on the 2/5 data leads A(B)Rϕ . . . A(B)R7.

In operation, the transistors Q8 and Q12 are turned ON upon receiving the ground level signals on the inputs ELϕ . . . EL7 and, in turn, turn ON respective ones of the transistors Q14–Q18 and transistors Q22–Q26. The flag signal on lead ELF is delayed 4 milliseconds which provides sufficient margin to assure that the scanpoint filters are stable and the data bits therefore valid. The flag signal then will turn ON transistor Q6, if input EL11 is not true, and, in doing so, will turn ON transistor Q39. The transistor Q39 in turning ON will, in turn, turn ON transistors Q19 and Q27, to provide the data indicator signal A(B)RD. When the call processor 18 now scans the receiver, both the 2/5 and the 1/2 codes are true, and the call processor will accept the data present.

As to the command signals, the commands from the operation of relays MRL, CPE, OFR or TRA are also diode "ored" into these two sets of transistors Q14–Q18 and Q22–Q26. The operation of a command relay MRL, CPE, OFR or TRA will inhibit any more of the command relays from being operated by turning OFF transistor Q2, and will operate the relay DLY. The operation of a command relay will disable the outputs caused from the inputs ELϕ . . . EL11 and ELF, by turning ON transistor Q3 which, in turn, turns transistor Q4 OFF.

In the case of the command signals, the data window is created by means of the operate and release characteristics of the relays MRL, CPE, OFR, TRA and DLY which, in the illustrated embodiment, are all miniature mercury wetted relays having an operate delay in the order of 1 to 2 milliseconds. In operation, one of the command relays MRL, CPE, OFR or TRA is operated, and the output signal of this relay is extended to the two sets of transistors Q14–Q18 and Q22–Q26 and to the delay relay DLY. The inherent operate delay of this delay relay DLY provides sufficient time for the data bits presented to the call processor 18 via the scan points to become true. When the delay relay DLY operates, it extends the ground level signal on the input lead MRL, CPE, OFR or TRAC through its normally open contact DLY1 to the transistor Q1 to turn it ON. Transistor Q1, in turn, turns ON transistors Q29 and Q21, to present the command 1/2 code indicator signal A(B)RC to the call processor 18. When both the 2/5 and the 1/2 data bits are true, the call processor 18 will accept the data present on the 2/5 data leads.

At the end of the command signal, this process is reversed. When the command on the input MRL, CPE, OFR or TRAC is removed, the transistor Q1 is turned OFF and immediately removes the command indicator signal A(B)RC, by turning transistors Q29 and Q21 OFF. The 2/5 data leads, however, are still under control of the command relay MRL, CPE, OFR and TRA and will remain true until this command relay restores, after the expiration of its inherent release time which again is in the order of 1 to 2 milliseconds. This guarantees that data will be present and true until after the command indicator signal has been removed, thereby preventing a misreading of changing data at the end of the time period.

In related operations, the transistor Q30 will turn ON if the input EL11 is true and input EL1 or EL7 is true. The transistor Q30, being ON, will turn ON transistor Q13 if input ELF is true. The output of transistor Q13 provides the command indicator signal A(B)RC. The transistor Q5 will turn ON when the input ELF is true and no command relay MRL, CPE, OFR or TRA has been operated. Transistor Q5, being ON, will turn OFF transistor Q2 to prevent presentation of any command signals until the digit from EL$\phi$ . . . EL11 has been presented.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a common control communication switching system including a call processor for processing calls through the system and a receiver for receiving MF and dial pulse information including means for forwarding this information in checkable code signals to the call processor via a plurality of data leads and together with control signals via control leads, the information being received at any time with respect to the time cycle of the call processor and the latter including means operating to accept the code signals forwarded to it only when code signals and a control signal are simultaneously present on both the plurality of data leads and the control leads, respectively, the improvement comprising an arrangement for preventing the false recognition of information presented by said receiver to said call processor, said arrangement comprising: a plurality of data leads and a plurality of control leads coupled to said call processor; said means for forwarding said checkable code signals including means for delaying said control signals forwarded to said call processor via said control leads for a pre-established time interval after said code signals on said data leads have been forwarded to said call processor to insure the receipt of said code signals on said data leads; whereby the validity of said code signals on said data leads are insured if a control signal also is present on said control leads.

2. In a common control communication switching system, the arrangement of claim 1 wherein said means for forwarding said information to said call processor comprises means for coding said information in a two-out-of-five code which is forwarded via said data leads and means for coding said control signals in a one-out-of-two code which is forwarded via said control leads, a control signal on one of said control leads being a digit indicating signal indicating that the code signals on said data leads constitute a valid digit and a control signal on another one of said control leads being a command indicating signal indicating that the code signals on said data leads constitute a command.

3. In a common control communication switching system, the arrangement of claim 2 wherein said means for coding said information comprises a plurality of command relays respectively operated by a command coupled to said receiver, a delay relay, a command relay upon being operated coupling a command to said data leads in said two-out-of-five code and energizing said delay relay, said delay relay being operated after a pre-established time interval to insure the receipt of said code signals on said data lead and causing said command indicating signal on said one control lead.

4. In a common control communication switching system, the arrangement of claim 3, wherein said command relays and said delay relay each is a mercury wetted relay having inherent operate and release characteristics which provide a sufficient time margin to guarantee that if said relay is operated at the same time that a command on said data leads is presented to said call processor to operate delay of said delay relay will provide sufficient time to insure the validity of the command on said data leads.

5. In a common control communication switching system including a call processor for processing calls through the system and a receiver for receiving MF and dial pulse information including means for forwarding this information in checkable code signals to the call processor, via a plurality of data leads together with control signals via control leads, the information being received at any time with respect to the time cycle of the call processor and the latter accepting the code signals forwarded to it when code signals and a control signal are simultaneously present on both the plurality of data leads and the control leads, respectively, the improvement comprising a method for preventing the false recognition of information presented by said receiver to said call processor, said method comprising the steps of: forwarding said checkable code signals to said call processor via said data leads; forwarding in addition to said code signals on said data leads said control signal on said control leads, said control signal indicating that the code signal on said data leads constitutes valid data; delaying the forwarding of said control signal for a pre-established time interval after said code signals on said data leads has been forwarded to said call processor to insure the receipt of said code signals on said data leads, whereby the validity of the code signals on the data leads are insured if a control signal also is present on the control leads.

6. In a common control communication switching system, the method of claim 5 wherein said information is forwarded to said call processor in a two-out-of-five code on said data leads, and wherein a pair of control signals are forwarded to said call processor via a pair of control leads, said pair of control signals being forwarded in a one-out-of-two code, one of said control signals indicating that said code on said data leads constitutes a digit and the other one of said control signals indicating that said code on said data leads constitutes a command.

7. In a common control communication switching system, the method of claim 6, wherein said control signal indicating that said code on said data leads constitutes a command is forwarded to said call processor after a pre-established delay after receiving a command, said control signal being removed immediately when said command is removed and said code on said data leads being presented to said call processor for a pre-established time interval after said command is removed.

8. In a common control communication switching system, the method of claim 7, wherein said pre-established delay is provided by the operation of one of a plurality of command relays, said command relay in operating forwarding a code on said data leads and operating a delay relay, said delay relay in operating forwarding said control signal indicating that said code on said data leads constitute a command, said command relays and said delay relay each having inherent operate and release characteristics which provide a sufficient margin to guarantee that if said delay relay is operated at the same time that a code on said data leads is presented to said call processor the operate delay of said delay relay will provide sufficient time to insure the receipt of the code on said data leads.

* * * * *